(12) United States Patent
Isomi (10) Patent No.: US 11,635,712 B2
(45) Date of Patent: Apr. 25, 2023

(54) MOTOR CONTROL APPARATUS AND IMAGE FORMING APPARATUS

(71) Applicant: Canon Kabushiki Kaisha, Tokyo (JP)

(72) Inventor: Yusuke Isomi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 30 days.

(21) Appl. No.: 17/491,913

(22) Filed: Oct. 1, 2021

(65) Prior Publication Data

US 2022/0107593 A1 Apr. 7, 2022

(30) Foreign Application Priority Data

Oct. 6, 2020 (JP) .............. JP2020-169428

(51) Int. Cl.
*H02P 6/28* (2016.01)
*H02P 27/08* (2006.01)
*G03G 15/20* (2006.01)

(52) U.S. Cl.
CPC ........... *G03G 15/2014* (2013.01); *H02P 6/28* (2016.02); *H02P 27/08* (2013.01)

(58) Field of Classification Search
CPC .......... H02P 27/00; H02P 27/04; H02P 27/06; H02P 27/08; H02P 27/085; H02P 29/00; H02P 29/40; H02P 2205/07; H02P 2205/01; H02P 2207/05; H02P 2203/09; H02P 21/00; H02P 21/0021; H02P 21/18; H02P 21/22; H02P 21/24; H02P 23/00; H02P 23/0027; H02P 23/07; H02P 23/14; H02P 23/18; H02P 25/00; H02P 25/066; H02P 25/022; H02P 25/062; H02P 25/064

See application file for complete search history.

(56) References Cited

U.S. PATENT DOCUMENTS

| | | | |
|---|---|---|---|
| 10,472,194 B2 * | 11/2019 | Seki | ........................ H02P 6/28 |
| 10,840,836 B2 | 11/2020 | Kameyama | |
| 11,159,110 B2 | 10/2021 | Isomi et al. | |
| 2019/0393812 A1 | 12/2019 | Kameyama | |

FOREIGN PATENT DOCUMENTS

| | | |
|---|---|---|
| JP | 09294390 A | 11/1997 |
| JP | 2008109835 A | 5/2008 |
| JP | 2019221075 A | 12/2019 |

\* cited by examiner

*Primary Examiner* — Antony M Paul
(74) *Attorney, Agent, or Firm* — Venable LLP (57) ABSTRACT

A motor control apparatus, including: a current detection unit configured to detect a current flowing through a coil of a motor; a voltage application unit configured to apply a voltage to the coil; and a control unit configured to control the voltage application unit by outputting a PWM signal in order to rotate the motor at a predetermined rotation speed, wherein the control unit detects a rotation state of the motor based on a duty of the PWM signal and a current value detected by the current detection unit.

8 Claims, 8 Drawing Sheets

MOTOR CONTROL APPARATUS AND IMAGE FORMING APPARATUS

BACKGROUND OF THE INVENTION

Field of the Invention

The present invention relates to a motor control apparatus and an image forming apparatus.

Description of the Related Art

As a conventional motor control, there is a sensorless control for controlling a motor without using a sensor configured to detect a rotation state such as a rotation speed of the motor (Japanese Patent Application Laid-open No. H09-294390). In the sensorless control, for example, the rotation speed of the motor is estimated and controlled based on a voltage applied to a coil, a current flowing through the coil, and an inductance and resistance value of the motor.

When performing motor control, however, it is required to detect the rotation state of the motor with higher accuracy than in the conventional sensorless motor control.

SUMMARY OF THE INVENTION

According to an embodiment of the present invention, a motor control apparatus comprises:

a current detection unit configured to detect a current flowing through a coil of a motor;

a voltage application unit configured to apply a voltage to the coil; and a control unit configured to control the voltage application unit by outputting a PWM signal in order to rotate the motor at a predetermined rotation speed, wherein the control unit detects a rotation state of the motor based on a duty of the PWM signal and a current value detected by the current detection unit.

Further features of the present invention will become apparent from the following description of exemplary embodiments with reference to the attached drawings.

DESCRIPTION OF THE EMBODIMENTS

The embodiments of the present invention will be described below with reference to the accompanying drawings.

First Embodiment

[Image Forming Apparatus]

Figure 1A:
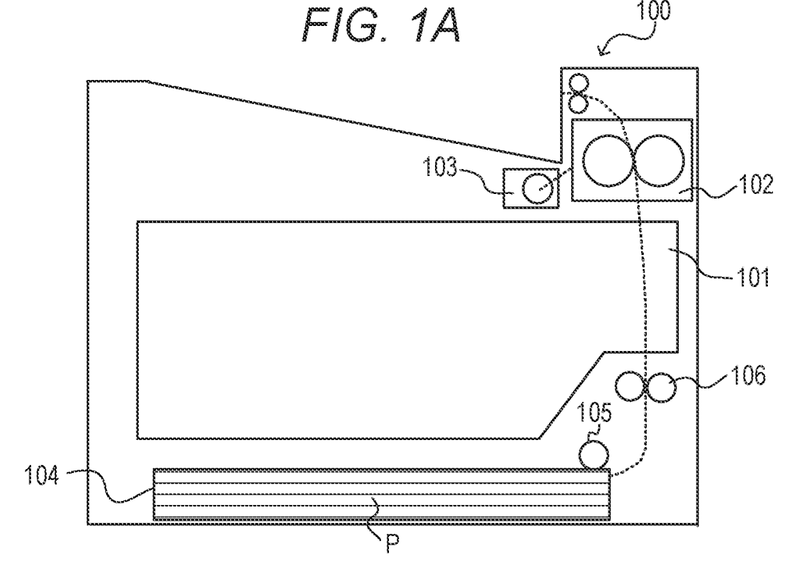
FIG. 1A is a cross-sectional view of a printer of a first embodiment.

FIG. 1A is a schematic cross-sectional view of a color laser printer as an example of an image forming apparatus. The image forming apparatus may be, for example, a printing apparatus, a printer, a copying machine, a multi-function machine, or a facsimile machine. A color laser printer 100 (hereinafter referred to as a printer 100) is a printer provided with image forming units 101 of four colors of yellow, magenta, cyan, and black. The printer 100 includes an image forming unit 101 using an electrophotographic process. The image forming unit 101 includes a photosensitive drum (not shown), an exposure unit 113 (FIG. 1B), a developing unit (not shown), and a transfer unit (not shown), forms toner images of respective colors, and transfers the formed toner images to a sheet P serving as a recording material. A fixing device 102 fuses and fixes toner of the unfixed toner images on the sheet P (on the recording material) transferred to the sheet P. A driving motor 103 (hereinafter referred to as a motor 103) is a motor configured to drive the fixing device 102. The sheet P is stored in a feeding cassette 104, picked up from the feeding cassette 104 by a feeding roller 105, and then conveyed by a conveying roller 106.

Figure 1B:
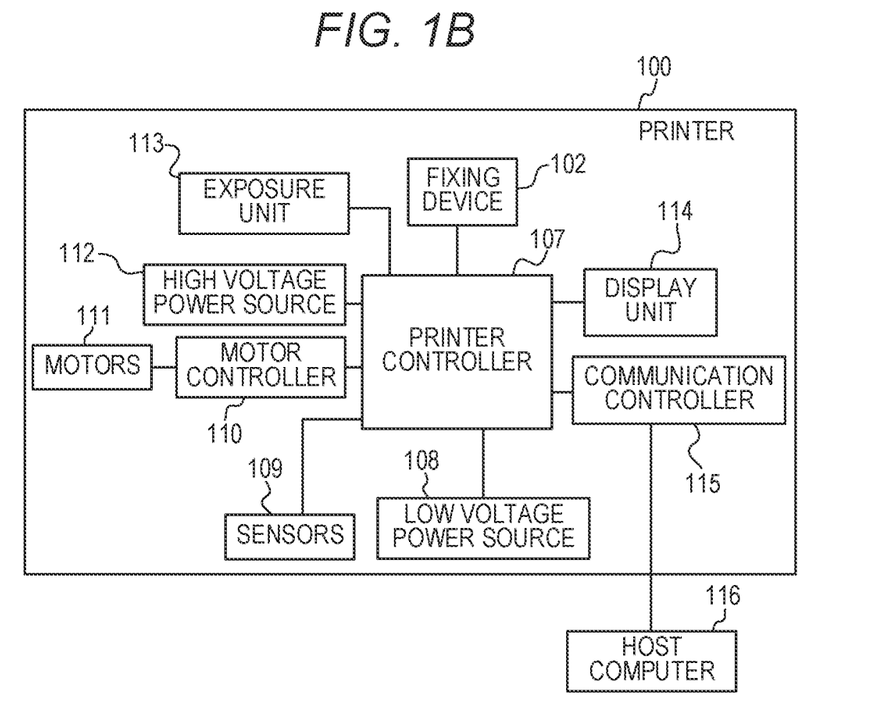
FIG. 1B is a block diagram of a control system of the printer of the first embodiment.

FIG. 1B is a diagram showing a schematic configuration of a control system of the printer 100. The structures having the same functions as those in FIG. 1A are designated by the same reference numerals and description thereof will be omitted. Each device of the printer 100 is controlled by a printer controller 107. The printer controller 107 includes a microcomputer (not shown) or the like. The printer controller 107 controls each device of the printer 100 according to various control programs stored in a memory (not shown) of the printer controller 107. Each device in the printer 100 is powered by a low voltage power source 108. The sensors 109 detect states of respective devices of the printer 100. A motor controller 110, which is a motor control apparatus, controls the drive of motors according to an instruction of a printer controller 107. The motors 111 are motors serving as power sources for respective devices in the printer 100, and include the motor 103 configured to drive the fixing device 102. A high voltage power source 112 is a power source configured to generate various voltages necessary for image formation. The exposure unit 113 exposes a photosensitive drum (not shown). The display unit 114 notifies the user of the operation state of the printer 100. A communication controller 115 communicates between a printer 100 and a host computer 116 configured to transfer data to be printed to the printer 100.

[Motor]

Next, a motor control system will be described with the motor 103 as a representative example from among the motors 111. The motors 111 include, for example, a motor configured to drive a photosensitive drum (not shown) and a motor configured to drive a roller configured to convey the sheet P. First, the motor controller 110 will be described in detail with reference to FIG. 2. The motor controller 110 drives the motor 103 under the sensorless control. That is, the printer 100 of the first embodiment does not have a sensor serving as a detection means for detecting the rotation state of the motor 103. The motor controller 110 includes, for example, a microcomputer 201 that is an arithmetic processing means. A microcomputer 201 incorporates a communication port 202, an analog-to-digital (hereinafter referred to as AD) converter 203, a counter 204, a nonvolatile memory 205, a reference clock generation unit 206, a memory 207, a PWM (pulse width modulation) port 208, and a current value calculation unit 209. The microcomputer 201 operates by being supplied with, for example, a voltage of VC1=3.3 V from the low voltage power source 108. The microcomputer 201 performs various communications with the printer controller 107 through the communication port 202.

Figure 2:
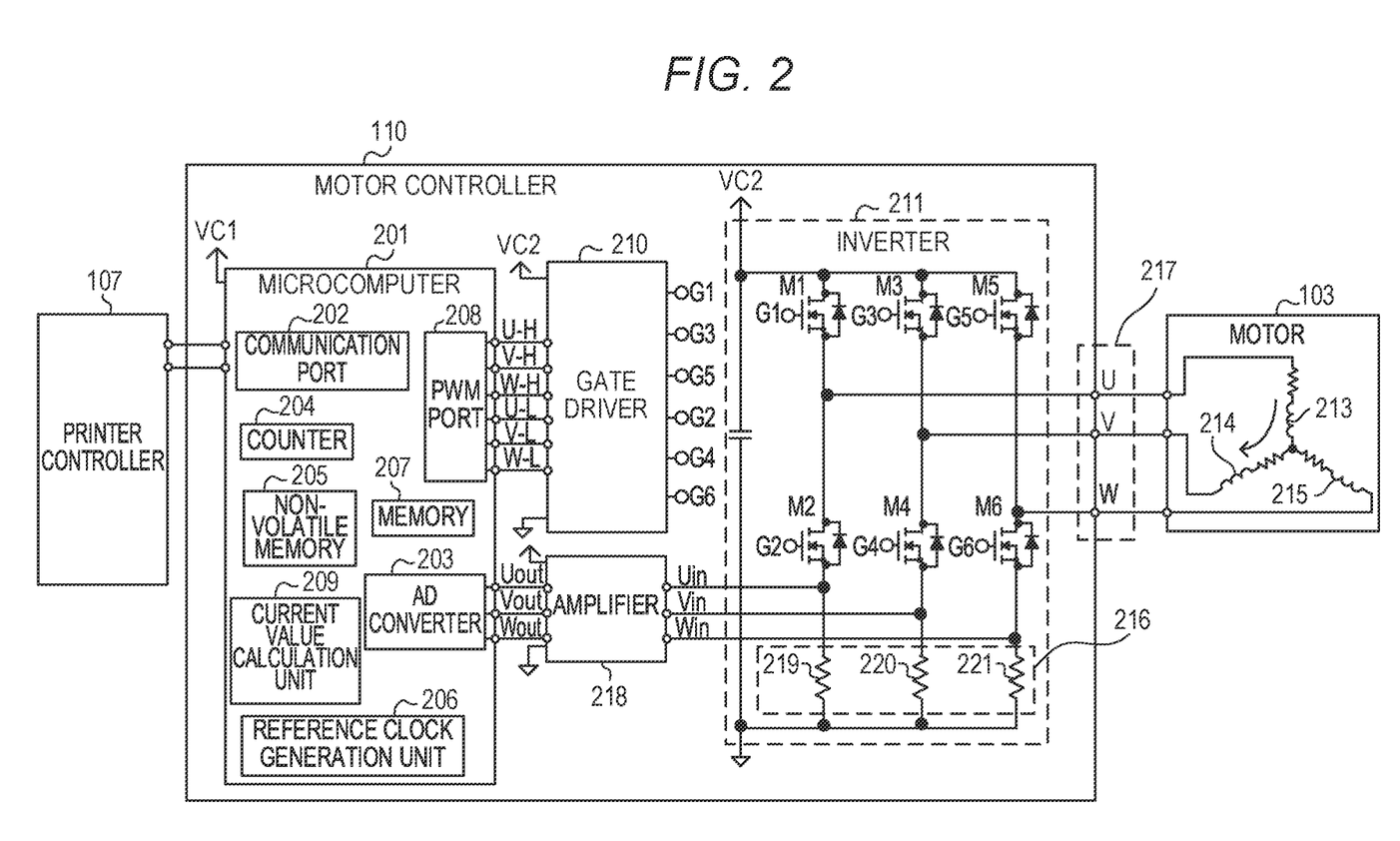
FIG. 2 is an explanatory view of a motor controller of the first embodiment.

The counter 204 performs a count operation based on the reference clock generated by the reference clock generation unit 206, and measures a period of the input pulse voltage and generates a PWM signal based on a count value obtained as a result of the count operation. The PWM port 208 has, for example, six terminals. Specifically, the PWM port 208 includes three terminals (U-H, V-H, W-H) for a high-side signal and three terminals (U-L, V-L, W-L) for a low-side signal, and outputs the PWM signal.

The motor controller 110 has an inverter 211 which is a voltage application unit configured to apply a voltage to the motor 103. The inverter 211 is a three-phase inverter comprising three switching elements M1, M3 and M5 for the high side and three switching elements M2, M4 and M6 for the low side. As the switching elements M1 to M6, for example, transistors or field effect transistors (hereinafter referred to as an FET) may be used. Gate terminals of the switching elements M1, M2, M3, M4, M5, and M6 are referred to as G1, G2, G3, G4, G5, and G6, respectively. Each of the switching elements M1 to M6 is connected to the PWM port 208 via the gate driver 210, and can be turned on (conductive) or off (nonconductive) by the PWM signal. In order to rotate the motor 103 at a predetermined rotation speed, the microcomputer 201 controls the inverter 211 by outputting the PWM signal of a predetermined duty through the gate driver 210.

The gate driver 210 and the switching elements M1 to M6 are connected such that G1, G2, . . . , and G6 of the gate driver 210 are connected to the gate terminal G1 of the switching element M1, the gate terminal G2 of the switching element M2, . . . , and the gate terminal G6 of the switching element M6, respectively. The gate driver 210 operates by being supplied with a voltage of, for example, VC2=24 V from the low voltage power source 108. Each of the switching elements M1 to M6 is turned on when the PWM signal is at a high level and turned off when the PWM signal is at a low level. A UVW phase output unit 217 of the inverter 211 is connected to coils 213, 214, and 215 of the motor 103, and can control currents (coil currents) flowing through the coils 213, 214, and 215. Here, a U terminal of the UVW phase output unit 217 is connected to one end of the coil 213 of the motor 103. A V terminal of the UVW phase output unit 217 is connected to one end of the coil 214 of the motor 103. A W terminal of the UVW phase output unit 217 is connected to one end of the coil 215 of the motor 103. The other end of the coil 213, the other end of the coil 214, and the other end of the coil 215 are connected.

The coil current of each coil 213, 214, 215 is detected by a current detection portion which is a current detection unit. The current detection portion includes a current sensor 216, an amplifier 218, the AD converter 203, and the current value calculation unit 209. The coil 213 of the motor 103 is connected to a current detection resistor 219 of the current sensor 216, the coil 214 of the motor 103 is connected to a current detection resistor 220 of the current sensor 216, and the coil 215 of the motor 103 is connected to a current detection resistor 221 of the current sensor 216. The coil current is converted into a voltage by the current sensor 216 comprising the current detection resistors 219, 220, and 221. The current detection resistor 219 of the inverter 211 is connected to an input portion Uin of the amplifier 218, the current detection resistor 220 of the inverter 211 is connected to an input portion Vin of the amplifier 218, and the current detection resistor 221 of the inverter 211 is connected to an input portion Win of the amplifier 218. The voltages converted by the current sensor 216 are input to the input portion Uin, the input portion Vin, and the input portion Win of the amplifier 218, respectively, and amplified by the amplifier 218 and an offset voltage is applied thereto. The amplifier 218 and the AD converter 203 are connected to each other through three terminals, and the voltages outputted from output portions Uout, Vout, and Wout of the amplifier 218 are inputted to the AD converter 203 of the microcomputer 201.

[Amplifier]

Figure 3:
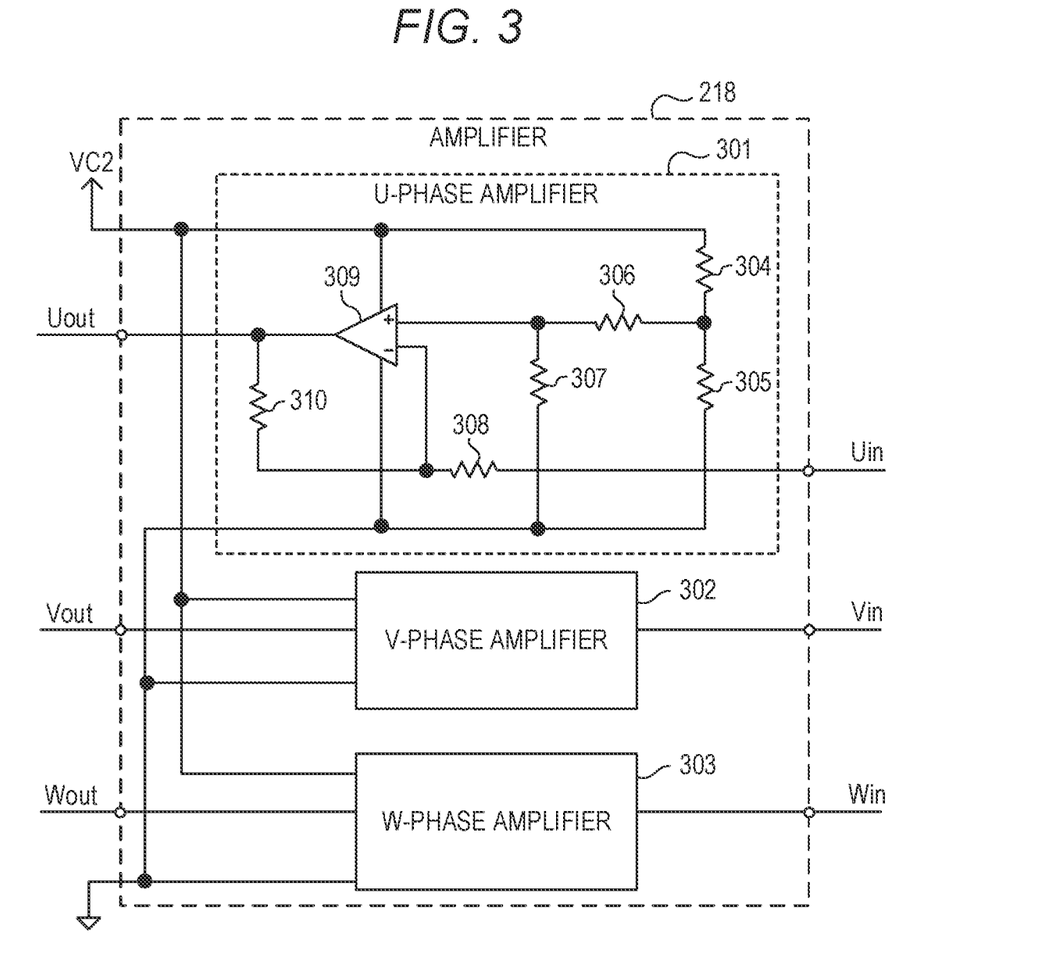
FIG. 3 is an explanatory view of an amplifier configuration of the first embodiment.

Next, a circuit configuration of the amplifier 218 will be described with reference to FIG. 3. The amplifier 218 comprises a U-phase amplifier 301, a V-phase amplifier 302, and a W-phase amplifier 303, and each amplifier has the same circuit configuration. In the first embodiment, the U-phase amplifier 301 is explained in detail as a representative. The U-phase amplifier 301 has resistors 304, 305, 306, 307, 308, 310 and an operational amplifier 309. In FIG. 3, the voltage input to an input portion Uin of the U-phase amplifier 301 is referred to as $V_{Uin}$, and the voltage output from an output portion Uout is referred to as $V_{Uout}$. The input-output relationship of the U-phase amplifier 301 is expressed by the following expression (1) using a resistor 304 (resistance value $R_{304}$), a resistor 305 (resistance value $R_{305}$), a resistor 306 (resistance value $R_{306}$), a resistor 307 (resistance value $R_{307}$), and VC2.

$$V_{Uout}=A \cdot V_{Uin}+V_{OST} \quad \text{Expression(1)}$$

$$A=R_{307}/R_{306}$$

$$V_{OST}=(R_{307}+R_{306})/R_{306} \cdot R_{305}/R_{304} \cdot VC2$$

In the expression (1), A is referred to as a gain and $V_{OST}$ is referred to as the offset voltage in the first embodiment.

For example, the current sensor 216 outputs the voltage of 0.1 [V] per 1 [A], the gain of the amplifier 218 is 10 times, and the applied offset voltage is 1.6 [V]. Then, when a current of −10 [A] to +10 [A] flows, the output voltage $V_{Uout}$ of the amplifier 218 becomes 0.6 [V] to 2.6 [V].

[AD Converter]

The AD converter 203 AD-converts a voltage (analog value) of, for example, 0 [V] to 3 [V] to a digital value of 0 to 4095, and outputs the AD value to the current value calculation unit 209. Therefore, when a current of −10 [A] to +10 [A] flows, the AD value is approximately 819 to 3459. The positive and negative of the current is assumed to be positive in the case in which the current flows from the inverter 211 to the motor 103.

[Current Value Calculation Unit]

The current value calculation unit 209 calculates a current value by performing a predetermined operation on the AD value which is data AD-converted by the AD converter 203. That is, the current value calculation unit 209 subtracts the offset value from the AD value and multiplies it by a predetermined coefficient to obtain the current value. Since the offset value becomes the AD value of the offset voltage of 1.6 [V], the offset value becomes approximately 2184, and the predetermined coefficient becomes approximately 0.00733. The current value calculation unit 209 reads the AD value when no current is supplied to the coils 213, 214 and 215 as the offset value, and stores the AD value in a memory (not shown or may be the memory 207), for example, and uses the AD value. The predetermined coefficient is previously stored in the nonvolatile memory 205 as a standard coefficient. Hereinafter, the above operation is described as current measurement or current detection. The current value detected by the current detection portion is described as a current measured value. Here, the current measured value obtained by the current detection resistor 219 is defined as a U-phase current measured value, the current measured value obtained by the current detection resistor 220 is defined as a V-phase current measured value, and the current measured value obtained by the current detection resistor 221 is defined as a W-phase current measured value.

[About Detection Error]

Next, the principle of detecting (detection error) that the motor 103 is rotating (during rotation) even in a state (stop state) in which the motor 103 is stopped will be described. The following expressions relate to the estimation of the rotation speed using a general induced voltage and are used in the case in which the motor controller 110 drives the motor 103 under the sensorless control in the first embodiment. For the sake of simplicity, a coordinate transformation from three phases to two phases ($\alpha$, $\beta$) is shown.

$$\hat{e} = \begin{pmatrix} \hat{e}_\alpha \\ \hat{e}_\beta \end{pmatrix} = T(s) \cdot (G_M(s) \cdot i + v) \quad \text{Expression (2)}$$

$$\hat{\omega} = \frac{d}{dt}\left(\tan^{-1}\frac{\hat{e}_\alpha}{\hat{e}_\beta}\right) \quad \text{Expression (3)}$$

"$\hat{\omega}$" represents the estimated rotation speed of the motor 103. "$\hat{e}$" represents the estimated induced voltage. T(s) represents a function including the gain used for estimating the rotation speed of the motor 103 and the estimated rotation speed "$\hat{\omega}$". $G_M$ represents a determinant (hereinafter referred to as a motor model $G_M$) representing a model of the motor 103 using the estimated rotation speed "$\hat{\omega}$" and the resistances and inductances of the coils 213, 214, and 215 of the motor 103. "v" represents a voltage (hereinafter referred to as a command voltage) for driving the motor 103. "i" represents the current flowing through the coil. Hereinafter, the estimated rotation speed "$\hat{\omega}$" of the motor 103 is simply referred to as an estimated speed "$\omega$". The induced voltages "$\hat{e}$", "$\hat{e}_\alpha$", and "$\hat{e}_\beta$" are simply referred to as "e", "$e_\alpha$", and "$e_\beta$".

The microcomputer 201 estimates the induced voltage "e" based on the function T(s), the motor model $G_M$, the command voltage "v", and the current "i" according to the expression (2). Next, using the expression (3), the microcomputer 201 obtains the estimated speed "$\omega$" based on a phase difference of the estimated induced voltages "$e_\alpha$", and "$e_\beta$" of the respective phases. The microcomputer 201 estimates the rotation state of the motor 103 based on the estimated speed "$\omega$". Here, unless the error between the resistances and inductances of the motor model and the motor 103 to be controlled is 0, the motor controller 110 may erroneously detect the occurrence of the induced voltage "e". As a result, in the system for estimating the rotation speed of the motor 103 by using the phase difference between the induced voltages "e" of the respective phases, the estimated speed "$\omega$" converges to a constant value in calculation, although the motor 103 is actually stopped. Since the estimated speed "$\omega$" converges to the constant value, the motor controller 110 may not be able to detect that the motor 103 is not rotating (stopped, out of step). Therefore, it is required to accurately detect the rotation state of the motor 103 under the sensorless control, for example, that the motor 103 is out of step.

[U-Phase Command Voltage and U-Phase Current Measured Value]

Figure 4:
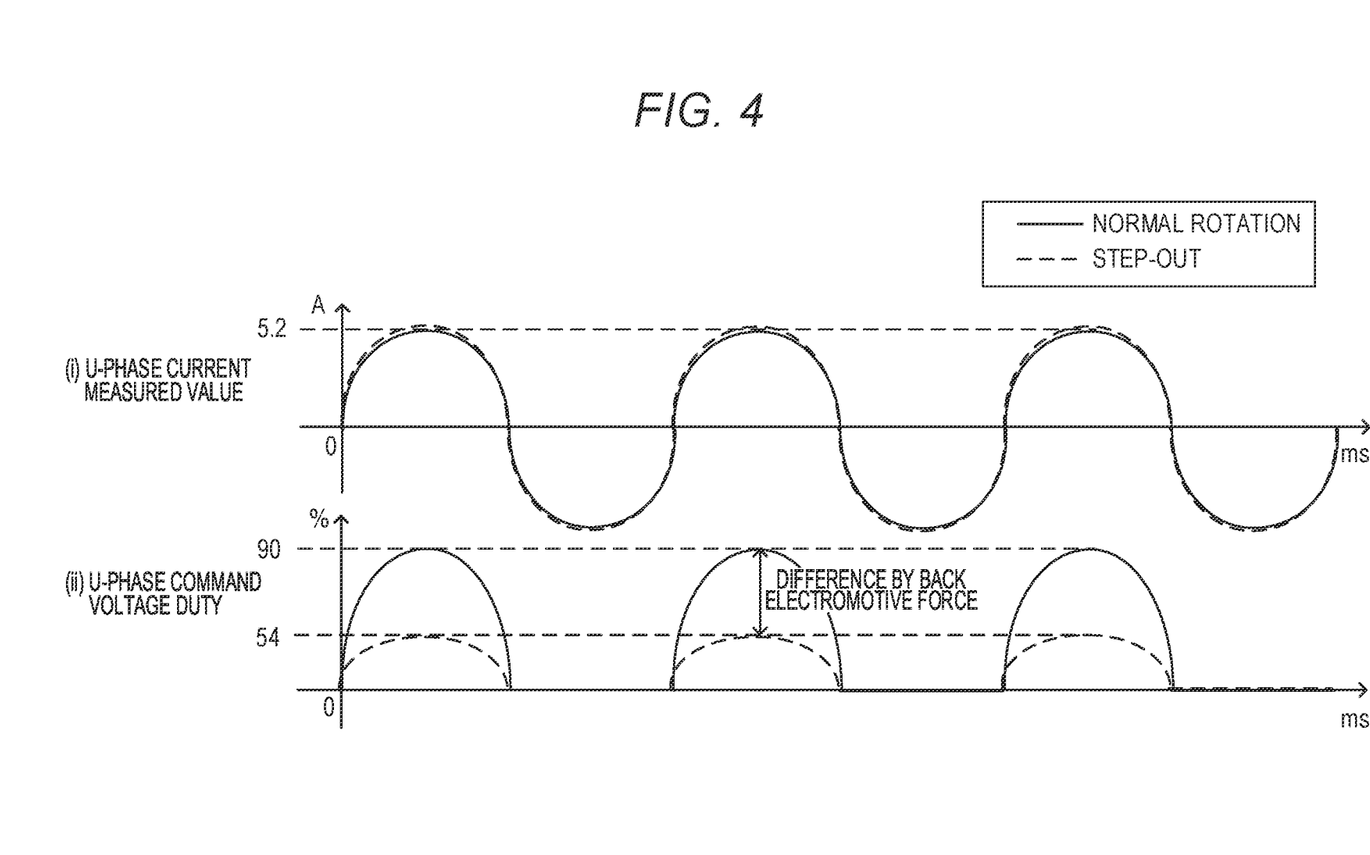
FIG. 4 is an explanatory view of a rotation state and a stop state of the motor of the first embodiment.

FIG. 4 is a graph showing (i) U-phase current measured values and (ii) U-phase command voltages during a normal rotation and a step-out of the motor 103, and the abscissa indicates time (milliseconds (ms)). The U-phase command voltage indicates the duty (hereinafter referred to as DUTY) of the PWM signal used when driving the U-phase high-side FET (the switching element M1)(hereinafter referred to as a U-phase command voltage DUTY). In FIG. 4, a solid line indicates the graphs at the normal rotation of the motor 103, and a broken line indicates the graphs at the step-out of the motor 103. Focusing on the U-phase current measured value, the magnitude of the U-phase current measured value is about the same (5.2 A) at the time of normal rotation and at the time of step-out of the motor 103. However, in the graph of the U-phase command voltage DUTY, it can be seen that the DUTY is very small at the time of step-out of the motor 103 (maximum 54%) compared to at the time of normal rotation of the motor 103 (maximum 90%). This is because, at the time of step-out, since the motor 103 is not rotated, the back electromotive force is not generated, and only the impedance of the coil 213 appears. As described above, the difference in the U-phase command voltage DUTY between the time of normal rotation of the motor 103 and the time of step-out of the motor 103 is caused by the difference in the back electromotive force. In the present invention, the rotation stop (step-out) of the motor 103 is determined using these conditions.

[Method for Determining Rotation Stop of Motor]

Next, a method of determining the rotation stop (step-out) of the motor 103 will be described with reference to the case where the U-phase command voltage DUTY and the U-phase current measured value are used. The motor controller 110 as a control unit detects the rotation state of the motor 103 based on the duty of the PWM signal and the current value detected by the current detection portion. Specifically, the motor controller 110 determines that the motor 103 is stopped in a case in which the U-phase command voltage DUTY is smaller than a threshold value 1, which is a predetermined first threshold value, and the calculated U-phase current measured value is larger than a threshold value 2, which is a predetermined second threshold value. Each threshold value is determined based on a command voltage DUTY and a current measured value obtained in one or more periods of an electric angle which is a predetermined period. In the first embodiment, the threshold value 1 is defined as a maximum value of the U-phase command voltage DUTY in a case in which the motor 103 is rotated at a predetermined rotation speed under a no-load condition.

The threshold value 2 is defined as a maximum value of the U-phase current measured value in a case in which the motor 103 is rotated at the predetermined rotation speed under an assumed maximum load condition. These calculations are performed, for example, during calibration or in the assembly process of the main body, and the threshold value 1 and the threshold value 2 are stored in a memory (not shown). Further, in an examination environment of a single motor using a jig and a tool or the like, it is also effective to obtain a command voltage under the no-load condition and a current measured value under the maximum load condition at the predetermined rotation speed, determine the threshold value 1 and the threshold value 2, and store them in the memory. In addition, although the maximum value of the command voltage DUTY and the maximum value of the measured current value were used as the threshold values, the minimum values, the effective values, the average values, the integrated values, and the like can also be used, and the present invention is not limited to the first embodiment. The rotation stop determination is always performed in a case in which the motor 103 is constantly rotated by sensorless driving.

Next, a series of processes from the determination of the specific threshold values to the rotation stop determination will be described with an example in which the motor 103, which is a DC brushless motor of a 5-pole pair, is rotated at 1000 rpm. In the first embodiment, the PWM carrier frequency is set to 40 kHz, and the motor controller 110 switches the command voltage DUTY for each phase obtained from the command speed and the load condition every 25 μs (microseconds). In addition, the motor controller 110 also obtains each current measured value every 25 μs. The motor controller 110 executes the process of determining the rotation and the stop of the motor 103 each time the current measured value is obtained.

Figure 5A:
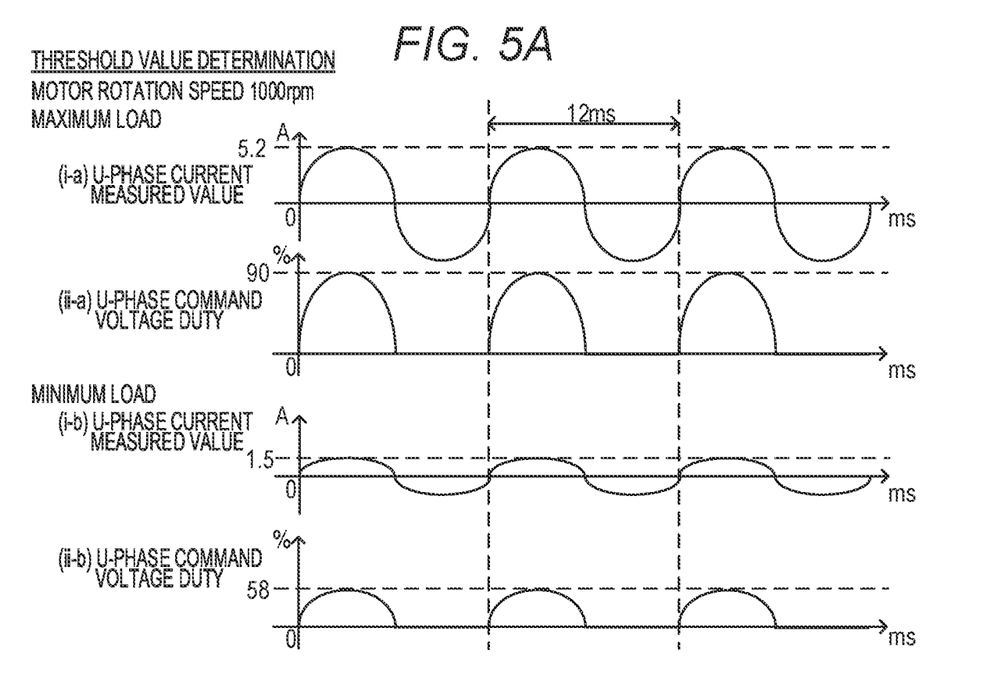
FIG. 5A and FIG. 5B are drawings for explaining a method of determining a rotation stop of the first embodiment.
Figure 5B:
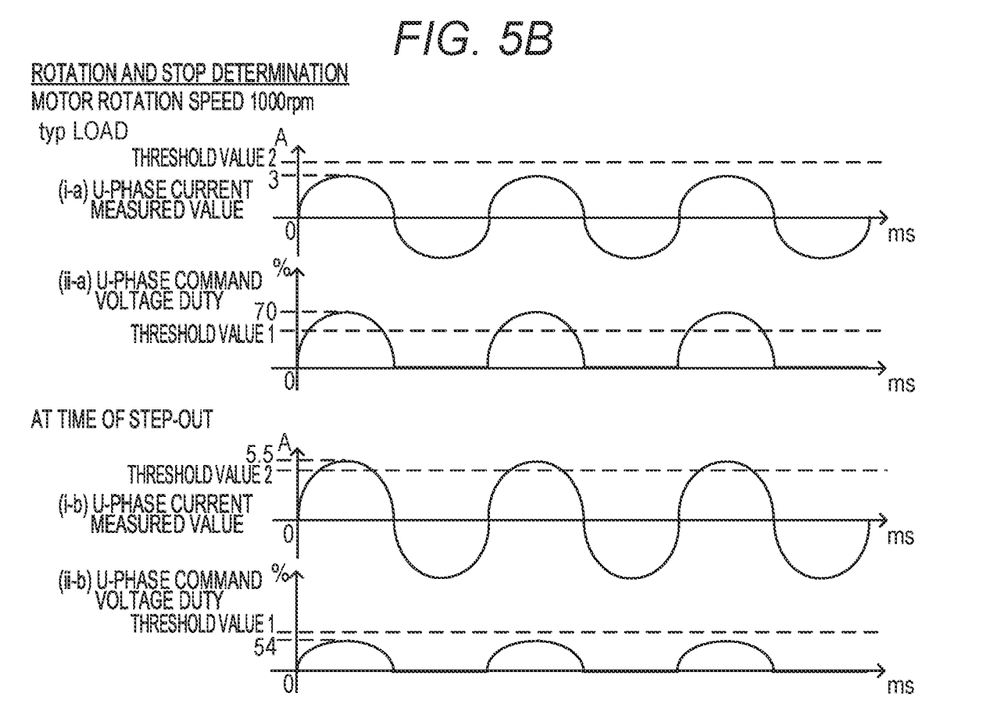

FIG. 5A shows (i-a) the U-phase current measured value and (ii-a) the U-phase command voltage DUTY under the maximum load condition (200 mN·m) within the range of the assumed load in the case in which the motor 103 is rotated at the rotation speed of 1000 rpm. In addition. FIG. 5A shows (i-b) the U-phase current measured value and (ii-b) the U-phase command voltage DUTY under the minimum load condition (0 mN·m) within the range of the assumed load. FIG. 5B shows (i-a) the U-phase current measured value and (ii-a) the U-phase command voltage DUTY at the typical (design) load condition (100 mN·m) (hereinafter referred to as a typ load condition). FIG. 5B also shows (i-b) the U-phase current measured value and (ii-b) the U-phase command voltage DUTY at the time of step-out. The horizontal axis indicates the time (ms).

(Determination of Threshold Value)

First, referring to FIG. 5A, it will be described that the threshold value 1 for the command voltage and the threshold value 2 for the current measured value are determined based on the U-phase command voltage DUTYs and the U-phase current measured values under the maximum load condition and the minimum load condition. The threshold value 1 is defined as the maximum value of the duty of the PWM signal output to the inverter 211 at the time of the minimum load within the range of the assumed load for the motor 103. In the first embodiment, the maximum value of the U-phase command voltage DUTY under the minimum load condition is, for example, 58%. Therefore, the motor controller 110 sets the threshold value 1 at 58% (the threshold value 1=58%). The threshold value 2 is defined as a current value detected by the current detection portion at the maximum load within the range of the assumed load for the motor 103. In the first embodiment, the maximum value of the U-phase current measured value under the maximum load condition is, for example, 5.2 A. Therefore, the motor controller 110 sets the threshold value 2 at 5.2 A (the threshold value 2=5.2 A). These threshold values are previously stored in the nonvolatile memory 205 in a manufacturing process or the like.

(Method of Determining Rotation Stop of Motor)

Next, a method of determining the rotation stop of the motor 103 using the set threshold value 1 and the set threshold value 2 will be described with reference to FIG. 5B. The motor controller 110 compares the magnitude relationship between the U-phase command voltage DUTY and the threshold value 1 and the magnitude relationship between the U-phase current measured value and the threshold value 2 each time the current measured value is obtained by the current detection portion. In a case in which the motor is rotated under the typ load condition, the maximum value (70%) of the U-phase command voltage DUTY shown in (ii-a) of FIG. 5B is larger than the threshold value 1 (58%), and the maximum value (3 A) of the U-phase current measured value shown in (i-a) is smaller than the threshold value 2 (5.2 A). From this, the motor controller 110 determines that the motor 103 is rotating.

On the other hand, when the motor 103 is out of step, the maximum value (54%) of the U-phase command voltage DUTY shown in (ii-b) of FIG. 5B is smaller than the threshold value 1 (58%), and the maximum value (5.5 A) of the U-phase current measured value is larger than the threshold value 2 (5.2 A). From this, the motor controller 110 determines that the motor 103 is out of step.

[Process for Determining Rotation Stop of Motor]

Figure 6:
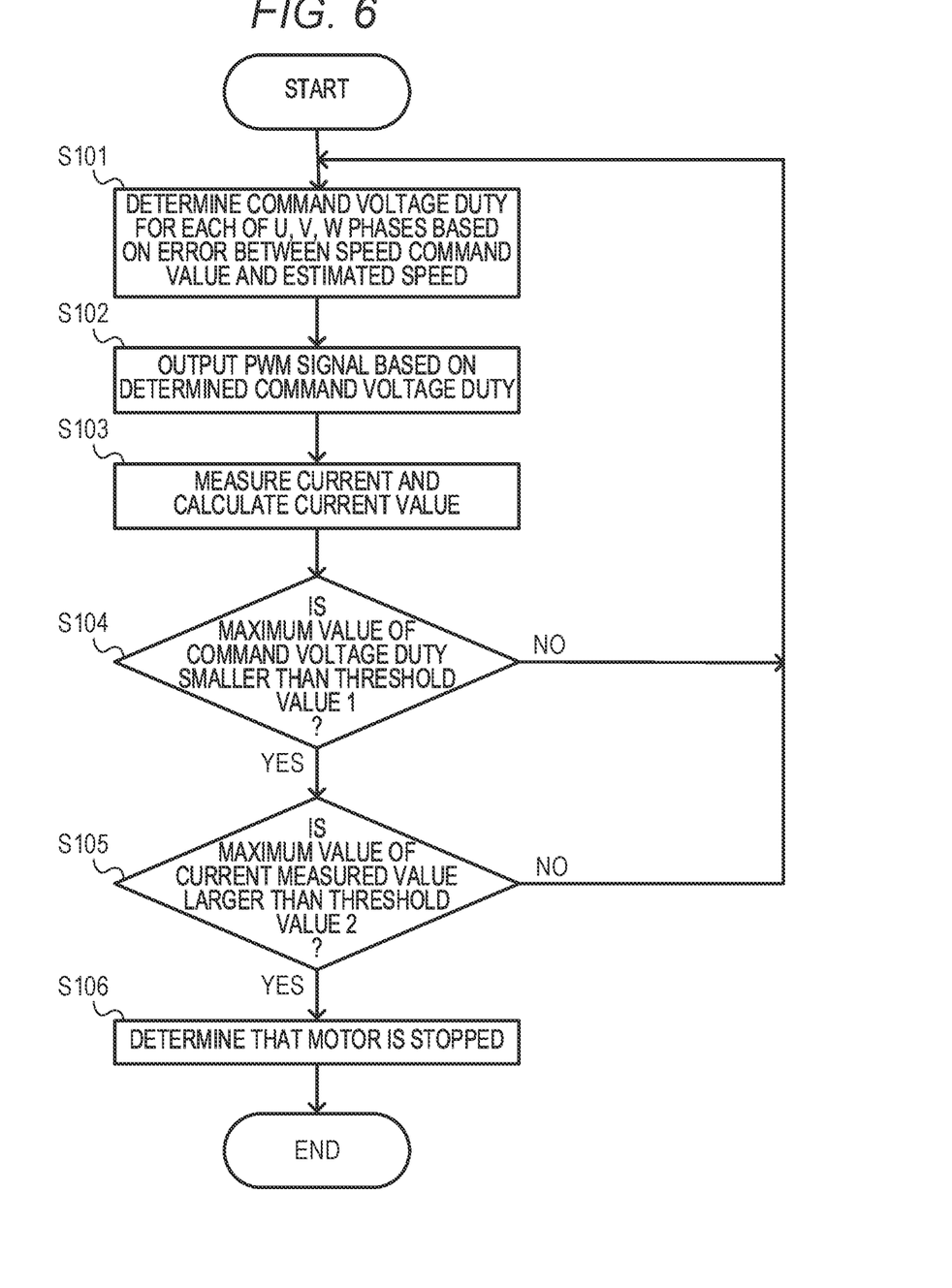
FIG. 6 is a flowchart for explaining a processing of the motor controller of the first embodiment.

With reference to FIG. 6, the operation of the motor controller 110 in executing the determination sequence of the rotation stop of the motor 103 will be described. FIG. 6 is a flowchart showing a process of determining the rotation stop by the motor controller 110, and also a flowchart showing a process of detecting the rotation state of the motor 103. In step (hereinafter referred to as S) 101, the motor controller 110 determines a command voltage DUTY for each of the U, V, and W phases based on an error between a predetermined rotation speed (hereinafter referred to as a speed command value) of the motor 103 and the estimated speed "ω" described above. Here, the predetermined rotation speed of the motor 103 is, for example, the rotation speed at the time of driving the fixing device 102 for forming an image on the sheet P. The estimated speed "ω" is obtained from the above expressions (2) and (3).

In S102, the motor controller 110 outputs a PWM signal from the PWM port 208 based on the command voltage DUTY determined in S101. In S103, in a case in which the motor controller 110 detects, for example, a U-phase current, the motor controller 110 performs current detection (current measurement) by the current detection portion using the output voltage $V_{U_{out}}$ that is the input value to the AD Converter 203. Specifically, the motor controller 110 calculates a current value by the current value calculation unit 209 via the inverter 211, the amplifier 218, and the AD converter 203 (arithmetic processing).

In S104, the motor controller 110 compares the U-phase command voltage DUTY with the threshold value 1 previously stored in the nonvolatile memory 205. Specifically, the motor controller 110 determines whether or not the maximum value of the command voltage DUTY is smaller than the threshold value 1 (for example, 58%). In a case in which the motor controller 110 determines that the U-phase command voltage DUTY is equal to or larger than the threshold value 1 (NO in S104), the process returns to S101. In a case in which the motor controller 110 determines that the U-phase command voltage DUTY is smaller than the threshold value 1 (YES in S104), the process proceeds to S105.

Here, the case in which the U-phase command voltage DUTY is smaller than the threshold value 1 includes a case in which the motor 103 is stopped and a case in which the load is light. The case in which the load is light may include, for example, a case in which a parameter for controlling the motor 103 is changed, a case in which there is an external load fluctuation such as switching of a clutch (not shown), a case in which the load becomes light transiently when the motor 103 is started, and the like.

In S105, the motor controller 110 compares the U-phase current measured value with the threshold value 2 stored in the nonvolatile memory 205. Specifically, the motor controller 110 determines whether or not the maximum value of the current measured value is larger than the threshold value 2. In a case in which the motor controller 110 determines that the maximum value of the U-phase current measured value is equal to or less than the threshold value 2 (NO in S105), the process returns to S101. In a case in which the motor controller 110 determines that the U-phase current measured value is larger than the threshold value 2 (YES in S105), the process proceeds to S106. In S106, the motor controller 110 determines that the motor 103 is stopped, and ends the process. In this way, the stop of the motor 103 is discriminated from the light load by the determination of S105. Thus, the sequence for determining the rotation stop of the motor 103 is ended. In the case in which the motor controller 110 determines that the motor 103 is stopped, the printer controller 107 may display information to that effect on the display unit 114 to notify the user.

Thus, by comparing the command voltage and the current measured value with the predetermined threshold values to determine the rotation state and the stop state of the motor 103, it is possible to determine the rotation stop of the motor with a simple configuration without performing complicated calculation. Although the embodiment of the present invention has been described in detail above, the present invention is not limited to the specific embodiment, and various modifications and variations are possible within the scope of the gist of the present invention described in the claims. In the first embodiment, the motor 103 is described as an example, but the present invention can be applied to other motors as well. By determining whether or not the motor is actually rotating based on the command voltage and the current measured value, the rotation state of the motor can be accurately determined without adding a rotation detection circuit.

As described above, according to the first embodiment, the rotation state of the motor can be detected more accurately than in the conventional sensorless motor control.

Second Embodiment

The second embodiment differs from the first embodiment in that a threshold value is determined from a ratio of a command voltage and a current measured value, and a rotation stop determination is performed by comparing the magnitude relationship between the threshold value and a ratio of the command voltage and the current measured value during rotation of the motor 103. In the second embodiment, the maximum value of the command voltage DUTY in one period of the electric angle and the effective value of the current measured value in the one period of the electric angle are calculated, and the quotient obtained by dividing the effective value of the obtained current measured value by the maximum value of the command voltage DUTY is used as the ratio. The threshold value is defined as a ratio between the command voltage and the current measured value in a case in which the motor is rotated under the load condition that provides the best drive efficiency. The obtained threshold value is stored in the nonvolatile memory 205. The motor controller 110 calculates the maximum value of the current effective value and the command voltage per one period of the electric angle during the rotation of the motor 103, and determines the rotation stop of the motor 103 by checking whether a ratio of the command voltage and the current measured value is larger than the threshold value that is previously determined.

[Method for Determining Rotation Stop of Motor]

Figure 7A:
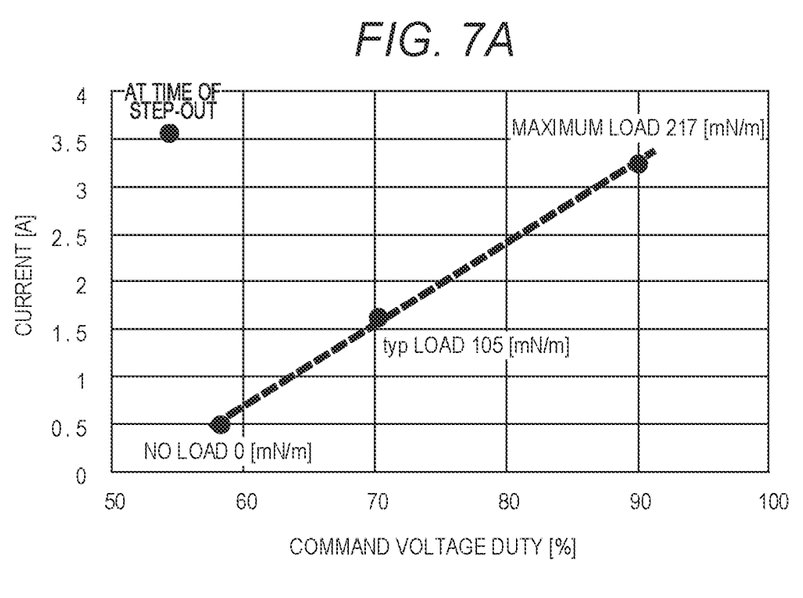
FIG. 7A and FIG. 7B are diagrams for explaining a method of determining a rotation stop of a second embodiment.

Since the circuit configuration of the second embodiment uses the same circuit configuration as that of the first embodiment, the rotation stop determination method will be described with the U-phase as an example. FIG. 7A shows the maximum value of the U-phase command voltage DUTY and the effective value of the U-phase current measured value obtained per one period of electric angle while changing the load applied to the motor 103, and the maximum value of the U-phase command voltage DUTY and the effective value of the U-phase current measured value at the time of step-out. FIG. 7A shows the command voltage DUTY [%] on the horizontal axis and the current [A] on the vertical axis. Data at no-load (0 mN/m), typ load (105 mN/m), maximum load (217 mN/m), and step-out are plotted in the graph. In the second embodiment, the control parameters of the motor 103 are set so that the efficiency of the motor 103 is maximized under the assumed maximum load condition. Therefore, the quotient of the effective value of the U-phase current measured value divided by the maximum value of the U-phase command voltage DUTY under the maximum load condition is stored in the nonvolatile memory 205 as the threshold value.

Figure 7B:
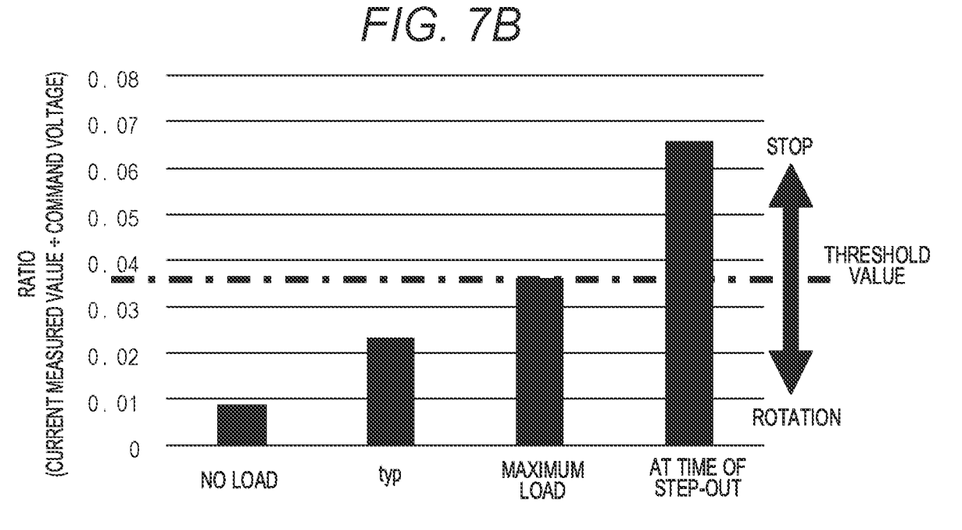

FIG. 7B shows a ratio (current measured value÷command voltage) between the U-phase command voltage and the U-phase current measured value obtained from the data shown in FIG. 7A. The dashed line is a set threshold value. During the rotation of the motor 103, the ratio of the U-phase command voltage to the U-phase current measured value is below the threshold value in any range from the no-load condition to the maximum load condition. On the other hand, in the stop state of the motor 103 (at the time of step-out), it can be seen that the ratio greatly exceeds the threshold value. Thus, a ratio of the U-phase command voltage and the U-phase current measured value under the maximum load condition is used as the threshold value, and the magnitude relationship between the threshold value and a ratio of the U-phase command voltage and the U-phase current measured value obtained during the rotation of the motor 103 is compared, thereby making it possible to determine the rotation stop. In the second embodiment, the threshold value is determined from the effective value of the current measured value and the maximum value of the command voltage DUTY, but the maximum value or the average value of the current measured value, the effective value or the average value of the command voltage DUTY, the integrated value, and the like may be used, and the present invention is not limited to the second embodiment.

Next, the second embodiment will be described using specific numerical values. The circuit configuration, the various constants, and the current detection process are the same as those described in the first embodiment, and the description thereof will be omitted. Here, the rotation stop determination in the case in which the maximum value of the U-phase command voltage DUTY and the effective value of the U-phase current measured value are used for the motor 103 which is a 5-pole pair motor rotating at 1000 rpm will be described.

(Determination of Threshold Value)

First, a third threshold value (hereinafter referred to as a threshold value) is determined. As a load condition in determining the threshold value, a condition in which the power efficiency is most improved is selected. In the second embodiment, in a case in which the motor 103, which is the 5-pole pair motor, is rotated at 1000 rpm, since one period of the electric angle in a predetermined period is 12 ms, the threshold value is determined from the effective value of the U-phase current measured value and the maximum value of the U-phase command voltage DUTY in the period of 12 ms. In FIG. 7A, since the effective value of the U-phase current measured value under the maximum load condition is 3.24 A and the maximum value of the U-phase command voltage DUTY is 90%, the threshold value is determined to be 3.24÷90=0.036. The threshold value is stored in the nonvolatile memory 205.

(Method of Determining Rotation Stop of Motor)

Next, the rotation stop determination during the steady rotation of the motor 103 will be described. The motor controller 110 detects the rotation state of the motor 103 based on the duty of the PWM signal and the current value detected by the current detection portion. Specifically, the detection is performed as follows. In the second embodiment, the motor controller 110 determines that the motor 103 is stopped in a case in which the motor controller 110 determines that a ratio of a current value detected by the current detection portion to a maximum duty of the PWM signal in the period of 12 ms is larger than the threshold value. First, in a configuration in which the command voltage is updated every 25 µs and the current measured value is obtained, the number of data items per one period (12 ms) of the electrical angle is 480. Therefore, the maximum value of the U-phase command voltage DUTY is calculated from the 480 pieces of command voltage information. Then, an effective value is calculated from 480 pieces of the U-phase current measured values. In FIG. 7A, taking the typ load condition as an example, since the maximum value of the U-phase command voltage DUTY is 70% with respect to the effective value 1.63 A of the U-phase current measured value, the ratio between the U-phase command voltage and the U-phase current measured value is calculated as 1.63÷70=0.023. Referring to FIG. 7B, since the calculated U-phase current measured value is below the threshold value 0.036, the motor controller 110 determines that the motor 103 is rotating. On the other hand, in a case in which the calculation is performed in the same manner during the step-out, since the maximum value of the U-phase command voltage DUTY is 54% with respect to the effective value 3.56 A of the U-phase current measured value, the ratio between the command voltage and the current measured value is calculated as 3.56÷54=0.065. Since the calculated ratio exceeds the threshold value 0.036, the motor controller 110 determines that the motor 103 is stopped.

[Process for Determining Rotation Stop of Motor]

Figure 8:
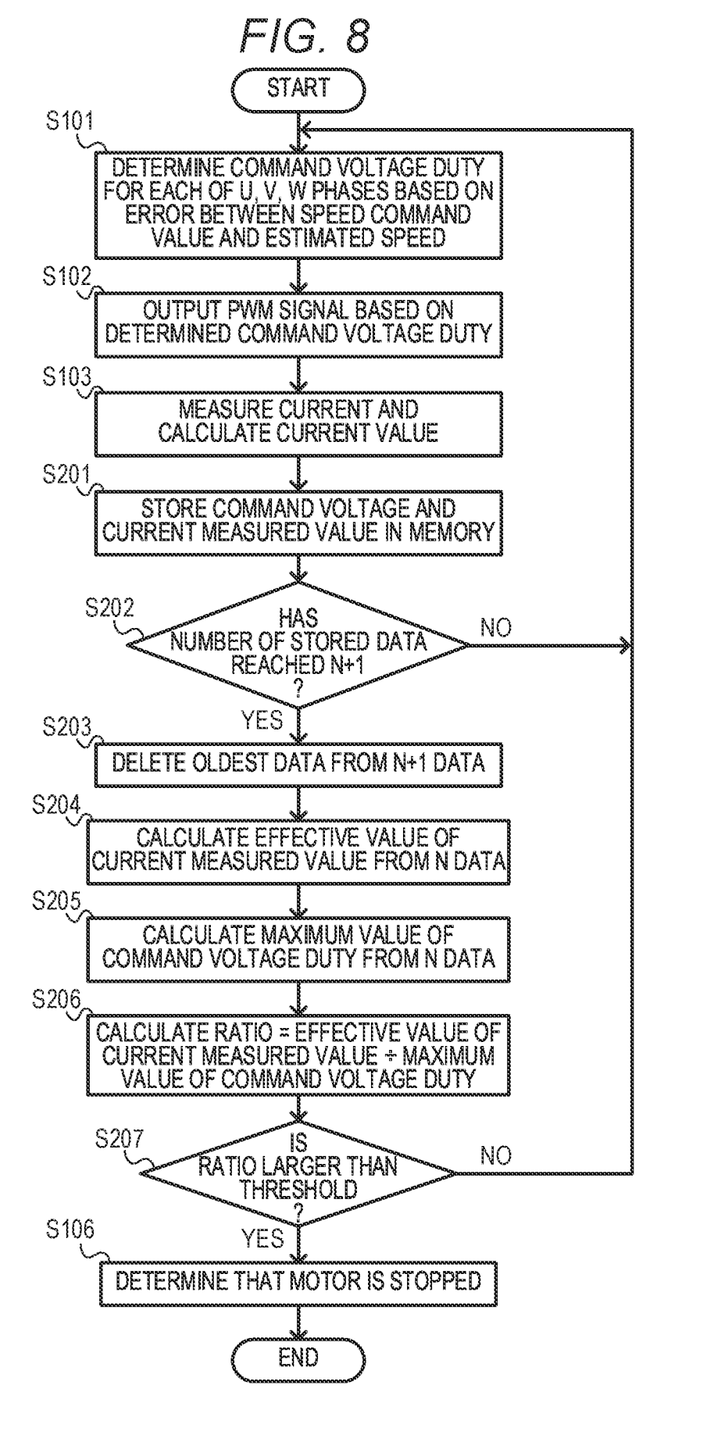
FIG. 8 is a flowchart for explaining a processing of a motor controller of the second embodiment.

Next, the operation of the motor controller 110 and the printer controller 107 in determining the rotation and stop of the motor 103 will be described. The operation of the motor controller 110 in executing the rotation stop determination sequence will be described with reference to FIG. 8. In FIG. 8, the steps of S101 to S103 and S106 are the same as the steps of S101 to S103 and S106 in FIG. 6 of the first embodiment, and their descriptions are omitted. In S201, the motor controller 110 stores the U-phase command voltage DUTY and the U-phase current measured value in a memory (not shown). In S202, the motor controller 110 determines whether or not the number of stored data has reached a predetermined number N+1 (for example, 480+1). In a case in which the motor controller 110 determines that the number of data has not reached the predetermined number N+1 (NO in S202), the process returns to S101. In a case in which the motor controller 110 determines that the number of data has reached the predetermined number N+1 (YES in S202), the process proceeds to S203.

In S203, the motor controller 110 deletes the oldest data of the stored data. This is because the rotation stop determination processing is always performed using the latest N pieces of data. In S204, the motor controller 110 calculates the effective value of the U-phase current measured value from the N pieces of data. In S205, the motor controller 110 calculates the maximum value of the U-phase command voltage DUTY from the N pieces of data. In S206, the motor controller 110 calculates the ratio between the maximum value of the command voltage DUTY calculated in S205 and the effective value of the current measured value calculated in S204 (the effective value [A] of the current measured value÷the maximum value [%] of the command voltage DUTY).

In S207, the motor controller 110 compares the magnitude relationship between the ratio obtained in S206 and the predetermined threshold value. Specifically, the motor controller 110 determines whether the ratio is larger than the threshold value. In a case in which the motor controller 110 determines that the ratio is equal to or less than the threshold value (NO in S207), the process returns to S101. In a case in which the motor controller 110 determines that the ratio is larger than the threshold value (YES in S207), the motor controller 110 advances the process to S106 and determines that the motor 103 is stopped. Thus, the rotation stop determination sequence ends. By comparing the ratio of the command voltage and the current measured value with the threshold value, whether the motor 103 is in the rotation state or the stop state can be determined.

As described above, according to the second embodiment, the rotation state of the motor can be detected more accurately than in the conventional sensorless motor control.

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-169428, filed Oct. 6, 2020, which is hereby incorporated by reference herein in its entirety.

What is claimed is:

1. A motor control apparatus, comprising:
   a current detection unit configured to detect a current flowing through a coil of a motor;
   a voltage application unit configured to apply a voltage to the coil; and
   a control unit configured to control the voltage application unit by outputting a PWM signal in order to rotate the motor at a predetermined rotation speed,
   wherein the control unit detects a rotation state of the motor based on a duty of the PWM signal and a current value detected by the current detection unit.

2. The motor control apparatus according to claim 1, wherein in a case in which the control unit determines that a maximum value of the duty of the PWM signal in a predetermined period is smaller than a first threshold value and the current value detected by the current detection unit is larger than a second threshold value, the control unit determines that the motor is stopped.

3. The motor control apparatus according to claim 2, wherein the first threshold value is a maximum value of the duty of the PWM signal output to the voltage application unit at a minimum load within a range of a load assumed for the motor.

4. The motor control apparatus according to claim 2, wherein the second threshold value is a current value detected by the current detection unit at a maximum load within a range of a load assumed for the motor.

5. The motor control apparatus according to claim 1, wherein in a case in which the control unit determines that a ratio of the current value detected by the current detection unit to a maximum value of the duty of the PWM signal in a predetermined period is larger than a third threshold value, the control unit determines that the motor is stopped.

6. The motor control apparatus according to claim 5, wherein the third threshold value is a ratio of a current value detected by the current detection unit to a maximum value of the duty of the PWM signal at a maximum load within a range of a load assumed for the motor.

7. The motor control apparatus according to claim 1, wherein the control unit estimates a rotation speed of the motor based on the PWM signal output to the voltage application unit, the current value detected by the current detection unit, and a resistance and inductance of the coil, and determines the duty of the PWM signal based on an error between an estimated rotation speed of the motor and the predetermined rotation speed.

8. An image forming apparatus, comprising:
   an image forming unit configured to form a toner image on a recording material;
   a fixing device configured to fix the toner image formed by the image forming unit to the recording material;
   a motor configured to drive the fixing device;
   a current detection unit configured to detect a current flowing through a coil of the motor;
   a voltage application unit configured to apply a voltage to the coil; and
   a control unit configured to control the voltage application unit by outputting a PWM signal in order to rotate the motor at a predetermined rotation speed,
   wherein the control unit detects a rotation state of the motor based on a duty of the PWM signal and a current value detected by the current detection unit.

* * * * *